R. S. BATES.
CHURN.
APPLICATION FILED OCT. 11, 1916.

1,232,184.

Patented July 3, 1917.
2 SHEETS—SHEET 1.

Witness
Hugh H. Ott

Inventor
R. S. Bates,
By Victor J. Evans
Attorney

R. S. BATES.
CHURN.
APPLICATION FILED OCT. 11, 1916.
1,232,184.
Patented July 3, 1917.
2 SHEETS—SHEET 2.
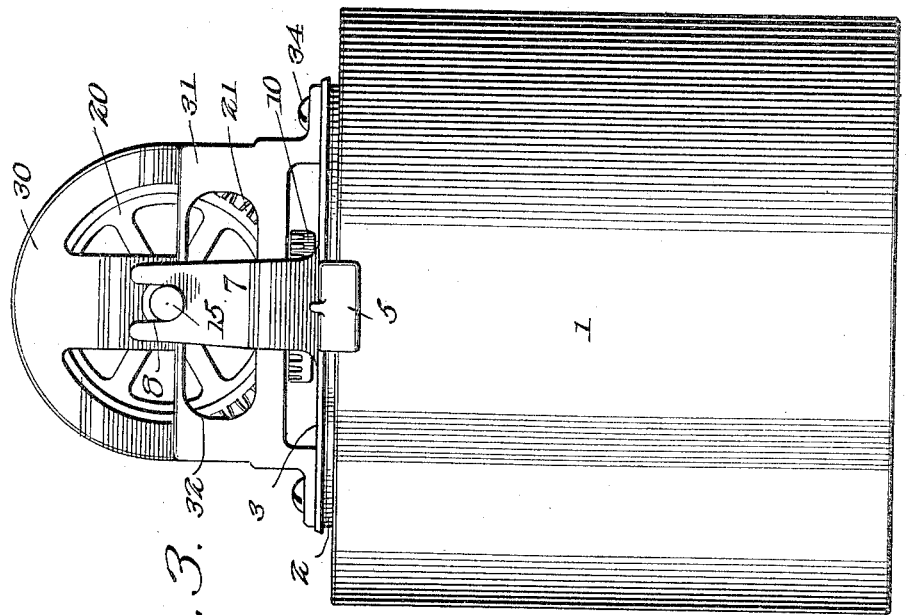
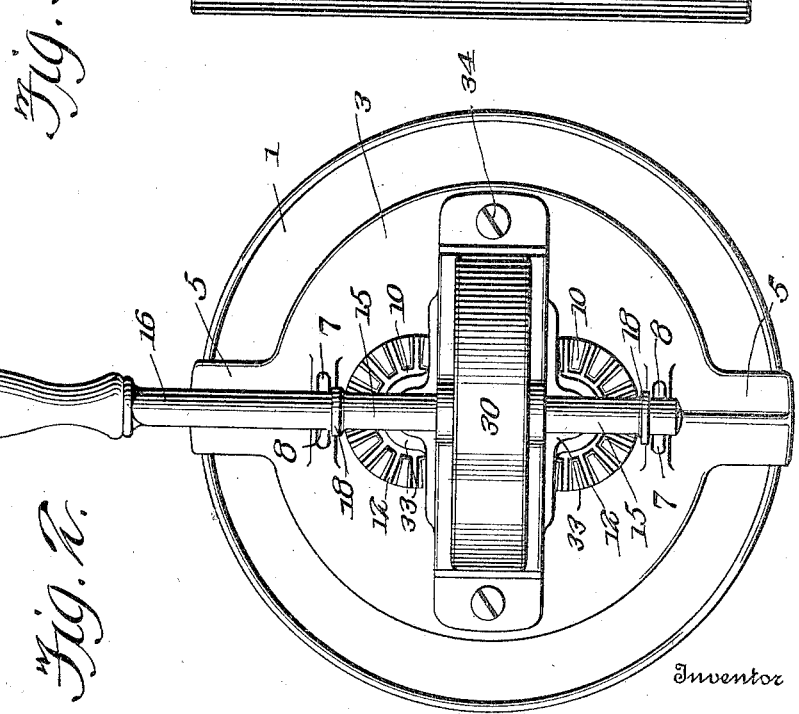
Witness
Hugh H. Ott
J. W. Garner
Inventor
R. S. Bates,
By Victor J. Evans
Attorney

UNITED STATES PATENT OFFICE.

RANDOLPH S. BATES, OF NEW YORK, N. Y.

CHURN.

1,232,184.  Specification of Letters Patent.  Patented July 3, 1917.

Application filed October 11, 1916. Serial No. 125,018.

*To all whom it may concern:*

Be it known that I, RANDOLPH S. BATES, a citizen of the United States, residing at New York, in the county of New York and State of New York, have invented new and useful Improvements in Churns, of which the following is a specification.

This invention is an improved churn which is also adapted for use in mixing liquid substances generally and for beating the same, the object of the invention being to provide an improved machine of this character which is simple in construction, which may be readily opened, which may be readily kept clean and in a sanitary condition, the parts of which may be readily assembled and disassembled, and which is not likely to get out of order.

The specific object of the invention is to provide an improved gearing for driving the revoluble stirring and mixing blades.

Another object is to provide an improved supporting and bearing element for the mixing blades.

Another object is to provide an improved form of cover which centers the inner vessel in the outer vessel also carries the revoluble stirring and mixing blades and the driving mechanism.

Another object is to provide a housing for the guiding gears and which also serves to hold the supporting and bearing element of the revoluble stirring and mixing blades.

With the above and other objects in view the invention consists in the construction, combination and arrangement of devices hereinafter described and claimed.

In the accompanying drawings:

Fig. 2 is a plan of the same.

Fig. 3 is a detailed elevation of the same at right-angles to Fig. 1.

Figure 1:
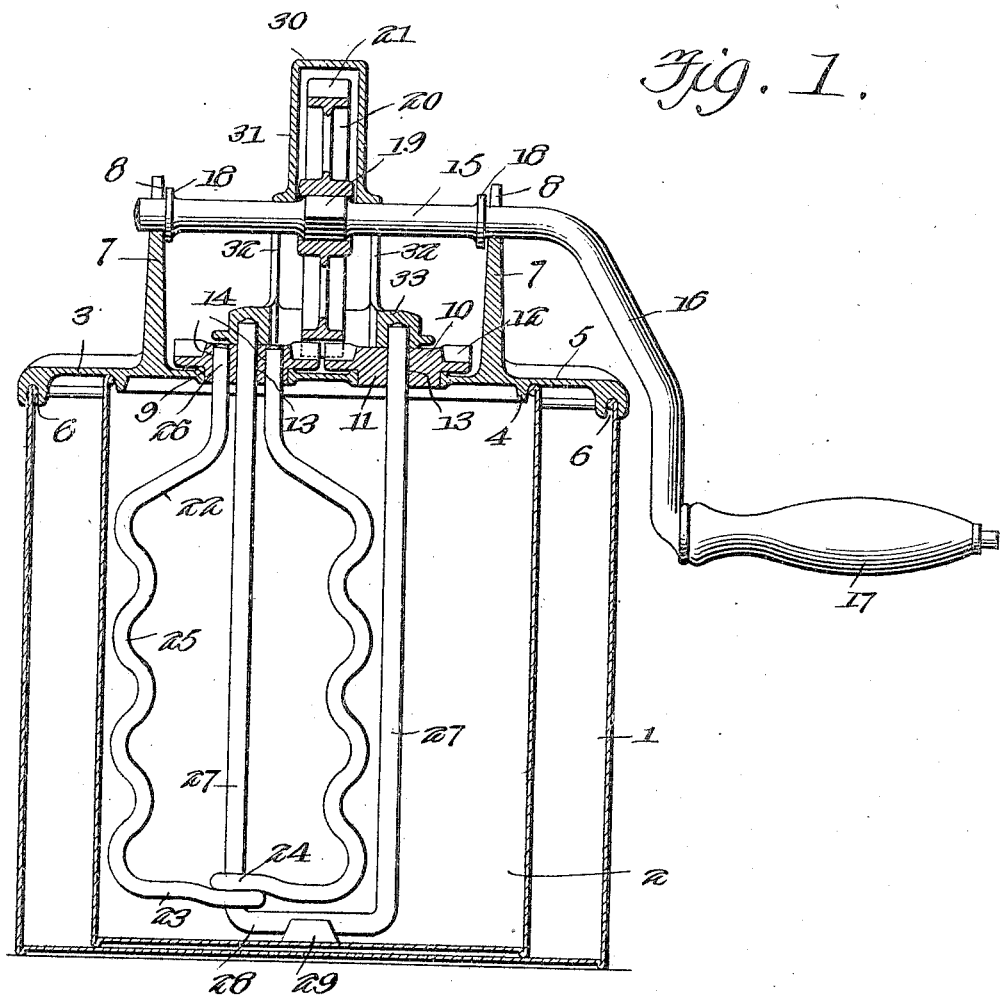
Figure 1 is a vertical central sectional view of the churn constructed and arranged in accordance with my invention.

In the embodiment of my invention I provide an outer vessel 1 and an inner vessel 2 which is of less diameter than the outer vessel and which when in use is arranged in the center thereof. These vessels may be made of sheet metal or any other suitable metal. The inner vessel may be readily detached or removed from the outer vessel.

I also provide a cover or main member 3 which in practice is preferably a casting and is here shown as circular and is provided on its under side with a depending annular flange 4 to fit in the upper side of the inner vessel 2. The cover also has a pair of oppositely arranged outwardly extending arms 5 which are provided on their under sides with slots 6 to receive the upper edge of the outer vessel 1. Hence the cover not only serves to cover the inner vessel but also serves to space and arrange the same concentrically in the outer vessel.

The cover is provided with a pair of standards 7 each of which has an open bearing slot 8 in its upper end. The cover is also provided with a pair of circular openings 9 which are spaced apart oppositely and are equally distant from the center of the cover.

A pair of gears 10 each of which has a downwardly extending hub 11 revolubly mounted in one of the openings 9. Each gear 10 has crown teeth 12 on its upper side and is also provided with a circular opening 13 and with a pair of openings 14 which are on opposite sides of and equally distant from the circular opening.

A shaft 15 is detachably mounted in the bearing slots 8 of the standards and has a crank 16 and a handle 17 to enable said shaft to be readily and manually turned. Said shaft also has annular fringes 18 which bear against the opposing sides of the standards and the shaft is further provided with a square and enlarged circular portion 19. A vertically arranged gear 20 has a square circular opening in which the portion 19 of the shaft is fitted. Said gear is relatively broad and is provided with spur teeth 21 to engage the gears 10, the said gear 20 being arranged to engage both of the gears 10 so that the said gears 10 will be simultaneously rotated in reverse direction when the gear 20 is turned by the shaft 15.

I also provide two pairs of revolubly mounted stirrers or mixing bars 22. The mixing bar of each pair are connected together at their lower ends as at 23, the connecting portion 23 being formed with a coil 24 which provides a bearing opening. The stirring bars are bent in sinuous form as at 25 and their upper ends are extended inwardly and vertically, their terminal portions 26 engaging in the openings 14 of the gears 10 and hence said stirring bars or elements are attached to said gears 10 and arranged for rotation thereby.

The revoluble stirring and mixing elements are mounted for rotation on the lower portions of the vertical arms 27 of a U-shaped supporting and bearing element 28 which extends downwardly in the center of the inner vessel 2 and has its lower portion centered on a shoe 29 which bears on the center of the bottom of the inner vessel and is secured thereto, the upper ends of the vertical arms 27 of the bearing and supporting element 28 passing through the central openings 13 of the gears 10 and projecting above said gears.

A housing 30 is provided which serves to cover the gear 20 and has its side walls 31 provided with openings 32 through which the shaft 15 extends. The housing also has lugs 33 which extend outwardly from its side walls and each of which bears on the center of one of the gears 10, said lugs having openings which receive the upper ends of the arms of the supporting and bearing member 28. The pairs of stirring and mixing elements are arranged at right-angles, and are so spaced with reference to each other that their planes of revolution intersect. This arrangement of the revoluble stirring and mixing elements, together with the form thereof adds greatly to their efficiency and causes them to thoroughly stir, beat, mix and agitate the material and to entirely counteract any tendency of the material to settle in layers. Hence the machine is highly efficient as a churn for making butter and is equally adapted for use for beating, stirring and mixing liquid and semi-liquid or thick substances of all kinds. The housing is detachably secured on the cover by screws 31.

It will be understood that the revoluble stirring elements, their supporting bearing and the driving mechanism are all carried by the cover so that by merely lifting the cover from the inner and outer vessels, the working parts of the churn are rendered accessible and hence may be readily and thoroughly cleansed and kept in perfectly sanitary condition. The U-shaped bearing and supporting member for the revoluble stirrers also serves to center the gears 10 and to cause said gears to rotate smoothly and evenly. The outer vessel is provided for the reception of hot water at any required temperature to raise the temperature of the cream to the desired point for churning.

Having thus described my invention, I claim:

In a machine of the class described, the combination of a main member, gears mounted in openings in the main member, a U-shaped member on the arms of which the gears are also mounted, agitators mounted on said arms and operated by the gears, operating means for the gears including a shaft removably mounted in bearings with which the main member is provided and a housing member for the operating means, detachably mounted on the main member, serving to hold said shaft in its bearings and also engaging the upper ends of the U-shaped member to maintain them in fixed relation.

In testimony whereof I affix my signature.

RANDOLPH S. BATES.

Copies of this patent may be obtained for five cents each, by addressing the "Commissioner of Patents, Washington, D. C."